United States Patent [19]

Fischer

[11] Patent Number: 4,962,820
[45] Date of Patent: Oct. 16, 1990

[54] DEVICE FOR PRODUCING DRILL HOLES HAVING AN UNDERCUT

[75] Inventor: Artur Fischer, Waldachtal, Fed. Rep. of Germany

[73] Assignee: fischerwerke Artur Fischer GmbH & Co. Kg, Waldachtal/Tumlingen, Fed. Rep. of Germany

[21] Appl. No.: 428,168

[22] Filed: Oct. 27, 1989

[30] Foreign Application Priority Data

Oct. 27, 1988 [DE] Fed. Rep. of Germany ....... 3836548

[51] Int. Cl.⁵ .............................................. E21B 1/00
[52] U.S. Cl. .................................. 175/220; 408/72 R
[58] Field of Search ............... 175/220, 414, 415, 416, 175/417, 418, 419, 420; 408/72 R, 88, 202, 144

[56] References Cited

U.S. PATENT DOCUMENTS

| 2,402,353 | 6/1946 | Trantmann | 408/202 X |
| 3,334,948 | 8/1967 | Qvarnstrom | 175/220 X |
| 4,154,311 | 5/1979 | Fischer et al. | 175/220 X |

FOREIGN PATENT DOCUMENTS

| 8221158 | 2/1983 | Fed. Rep. of Germany . |
| 3340090 | 11/1983 | Fed. Rep. of Germany . |
| 3704491 | 8/1988 | Fed. Rep. of Germany . |

Primary Examiner—William P. Neuder
Attorney, Agent, or Firm—Michael J. Striker

[57] ABSTRACT

A drilling device for producing drill holes having an undercut and comprising a drilling tool including a drilling shaft, a drilling head with a drilling plate located at the free end of the drilling shaft, a stop sleeve mounted on the drilling shaft and having an opening for guiding the drilling shaft, a stop collar fixedly connected with the drilling shaft and located inside of the stop sleeve, and an annular spring for securing the stop collar in the area of an opening of the stop sleeve which is located above the guide opening.

6 Claims, 1 Drawing Sheet

U.S. Patent        Oct. 16, 1990        4,962,820
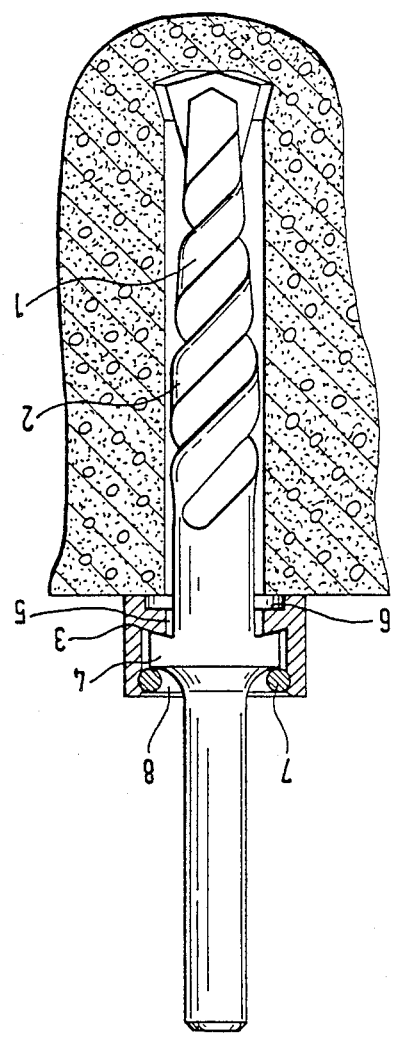

(4,962,820)

DEVICE FOR PRODUCING DRILL HOLES HAVING AN UNDERCUT

BACKGROUND OF THE INVENTION

The invention relates to a drilling device for producing drill holes having an undercut and comprising a drilling tool to be inserted into a drilling machine. The drilling tool includes a drilling shaft and a drilling head with driven plates located at the free end of the drilling shaft.

Drilling devices for producing drill holes that are provided in the region of the bottom of the drill hole with an undercut are known. The undercut is produced due to pivotal movement of the drilling shaft having a widened drilling head at the free end thereof. Into such a drill hole, there may be inserted an expansible fixing plug which, when in expansion, engages the undercut with a form-locking fit.

German Offenlegungsschrift No. 33 40 090 discloses a drilling device for producing a drill hole with an undercut. Because of the pivotal movements carried out during the drilling operation for producing undercuts, the mouth of the drill hole often becomes damaged, and the drilling device, which is guided with a relatively large degree of play in a guide sleeve, frequently becomes jammed.

SUMMARY OF THE INVENTION

The object of the invention is a drilling device for producing drill holes with undercuts in which jamming during the pivotal movement of the drilling shaft is prevented, and damage in the region of the drill hole mouth is avoided.

The object of the invention is achieved by providing the drill shaft with a stop collar which is secured to a stop sleeve by an annular spring that surrounds the upper edge of the stop collar and expands in the stop sleeve.

Since the drill shaft and the stop collar provided thereon are held loosely in the region of the stop sleeve, when the stop sleeve is positioned in the region of the drill hole mouth against the wall of a masonry construction, the stop sleeve does not rotate with the drilling shaft. Therefore, the wall is not damaged by the friction in the region of the drill hole mouth. The annular spring located in the region of the upper edge of the stop collar serves as a securing ring that fixes the stop sleeve axially.

Because the stop sleeve is formed of a tempered thin-walled steel, a stable stopping action is achieved when the drilling device is positioned against the masonry. The pivotal movements performed in the course of the drilling operation are nevertheless not hindered despite the stable stopping action.

The stop sleeve has a web portion which extends radially inward of the wall portion of the stop sleeve for supporting the stop collar. The bottom surface of the stop collar is formed concave, and the web portion of the stop sleeve has a complementary upper surface. This contributes substantially to reduction in the friction occurring during the drilling operation.

An annular recess which extends in the wall region of the guide opening defined by the web portion, also contributes to easier pivotal movement of the drilling shaft during the drilling operation and facilitates removal of the accumulating drilling dust.

The annular spring, which surrounds the upper edge of the stop collar and sprung into the stop sleeve, insures that the stop collar is secured in the region of the upper opening of the stop sleeve.

The invention both as to its construction so to its mode of operation, together with additional objects and advantages thereof, will be best understood from the following detailed description of the preferred embodiment with reference to the accompanying drawings.

BRIEF DESCRIPTION OF THE DRAWINGS

The single FIGURE shows an elevation view of a drilling device according to the invention which is located in a drill hole with an undercut.

DETAILED DESCRIPTION OF THE PREFERRED EMBODIMENT

FIG. 1 shows a drilling device which comprises a drilling shaft 1 having a drilling head 2 with drilling plates and an enlarged portion 3. The enlarged portion 3 acts as a pivot bearing when producing an undercut. In the region of the mouth of the drill hole, the drilling shaft 1 is guided through a stop sleeve 4. The stop sleeve 4 has a wall portion 5 and projecting radially inward therefrom a web portion 6. The web portion 6 defines a guide opening 7, a recess 8 located in the lower region of the guide opening 7, and an opening 9 arranged in the upper region of the guide opening 7. The drilling shaft 1 is provided with a stop collar 10 located inside of the stop sleeve 4. The stop collar 10 has a concave bottom surface that engages a complementary upper surface provided on the radial web portion 6. An annular spring 11 acts between an upper edge of the collar 10 and the stop sleeve 4 in the region of the opening 9 of the stop sleeve.

The stop collar 10 is preferably formed integrally with the drilling shaft 1. The stop sleeve 4 therefore is advantageously formed of a tempered thin-walled steel.

When the stop sleeve 4 abuts the outer surface of masonry, the drilling shaft reaches a predetermined depth. The sleeve 4, because of frictional engagement with masonry outer surface, does not rotate any more. To produce the undercut, the drill pivots about its axis, with the enlarged portion of the drilling shaft forming with the hole wall a pivot bearing. The concave bottom surface of the radial web portion of the stop sleeve, provides for pivotal (wobbling) movement of the drill shaft which otherwise would not have been possible. The axial positioning of the stop sleeve with respect to the stop collar that enables this wobbling movement, is insured by the annular spring 11.

While the invention has been illustrated and described as embodied in a drilling device for producing drill holes having an undercut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A drilling device for producing drill holes having an undercut said device comprising a drilling tool to be inserted into a drilling machine and including a drilling shaft having a free end; a drilling head with a drilling plate located on said free end of said drilling shaft; a stop sleeve mounted on the drilling shaft at a location remote from said drilling head and having a first opening for guiding said drilling shaft and a second opening located axially further away from said drilling head than said guide opening; a stop collar formed integrally with said drilling shaft and located inside said stop sleeve; and an annular spring for axially securing said stop collar to said stop sleeve in an area of said second opening of said stop sleeve.

2. A drilling device according to claim 1, wherein said stop sleeve has a recess extending in a region of said first opening which is removed from said second opening.

3. A drilling device according to claim 2, wherein said stop sleeve has a wall portion and a web portion projecting radially inwardly of said wall portion for supporting said stop collar and defining said first and second openings, and said recess.

4. A drilling device according to claim 3, wherein said web portion has an upper surface at least partially defining said second opening, said stop collar having a upper bottom surface complementary to said concave surface of said web portion.

5. A drilling device according to claim 1, wherein said stop sleeve is formed of a tempered thin-walled steel.

6. A drilling device according to claim 1, wherein said annular spring expands in said area of said second opening to secure said stop collar to said stop sleeve.

* * * * *